Feb. 9, 1937.  C. P. McHUGH  2,070,291
RUBBER LINED PIPE COUPLING
Filed Nov. 26, 1934
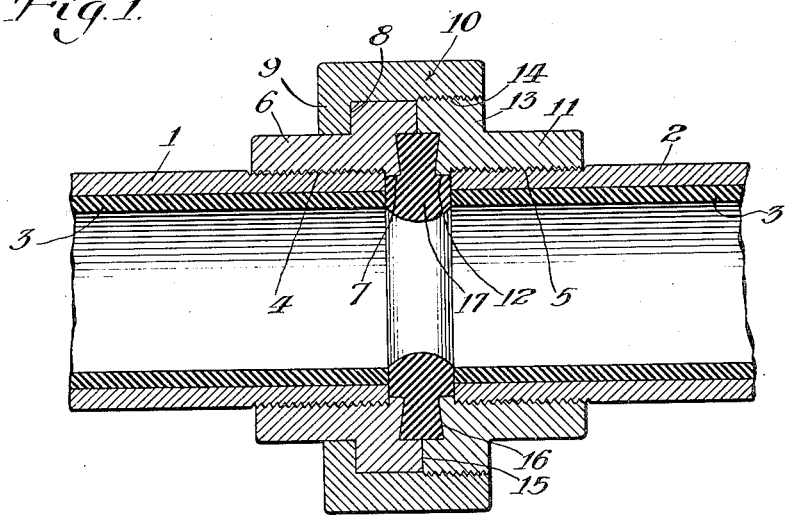
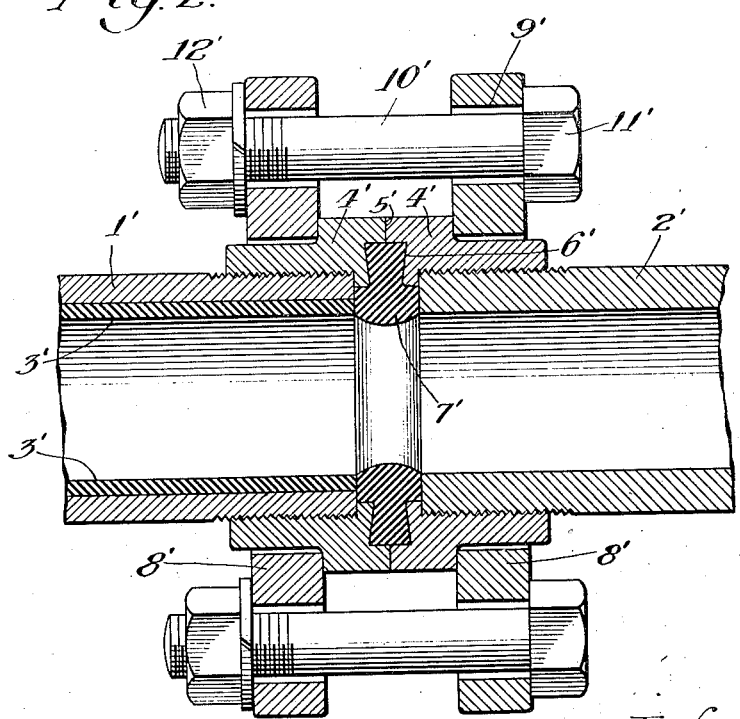
Inventor:
Charles Patrick McHugh
By Lee J. Gary
Attorney.

Patented Feb. 9, 1937

2,070,291

UNITED STATES PATENT OFFICE 2,070,291

RUBBER LINED PIPE COUPLING

Charles Patrick McHugh, Passaic, N. J., assignor to Raybestos-Manhattan, Inc., Bridgeport, Conn., a corporation of New Jersey Application November 26, 1934, Serial No. 754,744

2 Claims. (Cl. 285—120)

This invention relates to improvements in means for joining sections of pipe having rubber or other corrosive resistant linings, and refers specifically to means for joining such sections and fittings, including valves, T's, elbows or the like without the use of rubber covered pipe flanges.

Rubber lined pipe has been used for many years to convey corrosive or abrasive materials. One of the serious limitations in the use of this pipe is the fact that in the past it has been necessary to use in conjunction with this pipe rubber covered flanges and gaskets to connect one length of pipe to another or to fittings, and the flanges must be applied to the pipe or fittings prior to the rubber covering so that there may be no break in the continuity of the protective coating. It has, therefore, been necessary to prepare the entire pipe line in advance, cutting each length of pipe to exact size, place the flanges on each end of the pipe, then send the flanged pipes and fittings to a rubber manufacturing plant to have the necessary rubber linings attached; therefore, after the pipe has been prepared, it is not possible to make any alterations in the pipe line without scrapping all or part of the pipe already lined and the shipping of additional lengths of pipe to the rubber manufacturer for lining, thus entailing undue expense and often costly delays.

In general, couplings or unions comprise two bushings threaded on the inside to receive the threads on the ends of the pipe to be connected. One of these bushings may be provided with an outside, raised, smooth-faced shoulder and the other bushing may be threaded on the outside. After the bushings are placed on the ends of the pipes a locking ring or coupling which has been threaded part way on the inside, is slipped over the smooth-faced bushing and is screwed on the thread of the bushing which has been threaded on the outside.

As a feature of my invention I provide, in conjunction with the general type of bushing above described, means for joining adjacent pipe sections or pipes to fittings such as valves, T's, elbows and the like whereby the continuity of the rubber lining is maintained adjacent the connection of the fitting to the pipe or adjacent the coupling between adjacent pipes.

I have found that in order to make a proper coupling to connect rubber lined pipe, valves, T's, elbows, etcetera, it is essential:

1. To construct the bushings in such a manner that they can be readily attached to the pipe in a predetermined position with relationship to the end of the pipe.

2. That the bushings be so constructed that, when drawn together by the lock ring or collar, the bushings assume a predetermined position in relationship to each other and provide an annular groove or recess of substantially uniform shape and dimensions.

3. That the bushings be so constructed that they can receive a gasket which can be compressed or distorted to a predetermined degree when the coupling is assembled.

4. That the bushings be designed and the gaskets so constructed that, when the coupling is drawn up tight, the gasket will not be squeezed or drawn out of position, but will have substantially uniform pressure over its engaging faces.

5. That the coupling be so constructed that all strains resulting from the moving or bending of the pipe line must be substantially relieved from being transmitted to the gasket itself or to the rubber lining.

I have found that these results can be secured by the use of couplings illustrated in the drawing and hereinafter described in detail in the specification.

In the drawing, Fig. 1 is a longitudinal sectional view taken through a juncture at the ends of adjacent rubber lined pipe.

Fig. 2 is a similar view of a modification of my invention.

Referring in detail to the drawing, 1 and 2 indicate the abutting ends of two sections of pipe which are adapted to be connected together, each of the pipes having a continuous rubber lining 3. It is to be understood, of course, that my invention is not to be limited to the specific type of material used for lining purposes, since any substantially resilient material which is abrasive and/or corrosive resistant is contemplated. In addition, the ends 1 and 2 instead of comprising portions of the usual pipe section may comprise the ends of such fittings as valves, T's, elbows and the like.

Each of the sections 1 and 2 may be provided with external threads 4 and 5, respectively. A bushing 6 may be adapted to threadedly engage threads 4, said bushing being threaded upon its internal surface. The bushing 6 may be provided with an inwardly extending annular flange 7 which is adapted to abut the end of the pipe 1 when bushing 6 has been completely threaded upon said pipe. In this manner threads 4 need not be tapered and may be of the type known as "loose threads". Bushing 6 may also be provided with an outwardly extending annular shoulder 8 which is adapted to engage with the downwardly extending annular flange 9 of collar 10.

A bushing 11 may be threadedly mounted upon the end of pipe 2, said bushing being internally threaded whereby to engage threads 5. Similar to bushing 6, bushing 11 may also be provided with an inwardly extending annular flange 12 which is adapted to abut the end of pipe 2. Bushing 11 may also be provided with an outwardly extending annular flange 13, the external surface or periphery of which may be provided with threads 14. Collar 10 may be internally threaded at the end thereof opposite the flange 9, said threads being adapted to engage with threads 14 upon the annular flange 13.

To utilize this type of coupling or union the inner surface of flange 9 may be ground to fit shoulder 8 and collar 10 may be loosely mounted upon bushing 6. When the internal threads of collar 10 engage threads 14 upon the flange 13 the ends of the outwardly extending projecting flanges upon each bushing are preferably brought to an abutting position, as shown at 15 in Fig. 1. When the bushings have been so relatively positioned an annular recess 16 is provided between said bushings and is adapted to receive the outer portion of the annular gasket 17, said gasket being constructed of rubber or other resilient, abrasive or corrosive resistant material. The inner portion of gasket 17 is positioned between the abutting ends of the linings 3 of each pipe, thereby providing a continuous abrasive or corrosive resistant lining bridging the juncture of the two pipes. When bushings 6 and 11 are brought together until the ends of said bushings abut, as at 15, gasket 17, confined between said bushings and also between the abutting ends of the pipes 1 and 2 and linings 3, will be compressed or distorted to a predetermined degree, thereby providing a leak-proof seal.

As a feature of my invention a leak-proof seal is provided between the abutting ends of connected pipes or fittings, said seal also functioning as a continuation or bridge of the corrosive or abrasive resistant linings of the connected pipes or fittings. In addition, in view of the fact that when the coupling of the pipes has been completed the ends of bushings 6 and 11 are usually brought to the abutting position shown at 15, stresses at the juncture of the pipes due to alignment and bending will be sustained by the metal to metal contact of said bushings and such stress will be prevented from acting upon the gasket 17 thereby preventing its exposure to excessive stress or strain.

Referring particularly to Fig. 2, a modification of my invention is shown wherein pipes 1' and 2' are connected together. Pipe 1' may have an abrasive or corrosive resistant lining 3' similar to lining 3 and pipe 2' may be unlined. However, the thickness of pipe 2' may be equal to the sum of the thicknesses of the wall of pipe 1' plus its lining 3'. Similar to the form of my invention shown in Fig. 1, pipes 1' and 2' may comprise the ends of the usual pipe sections or either may comprise an end of a fitting such as a valve, T, elbow or the like.

It is to be understood, of course, that if desired pipe 2' may be lined with rubber similar to pipe 1' in which case the thicknesses of the pipes with their linings will be equal. In addition, either or both of pipes 1 and/or 2 may be similar to pipe 2'. When a pipe such as pipe 2' is used, the same may be constructed of any desired metal which may or may not be resistant to abrasion or corrosion.

Bushings 4', similar in construction to bushing 6, may be threaded upon the ends of pipes 1' and 2' and the ends thereof may be normally brought to abutting position as shown at 5' in Fig. 2. When the bushings 4' are thus brought to abutting position, a recess 6' is provided therebetween of definite shape and dimensions in which a gasket 7', similar in construction to gasket 17, may be positioned.

To maintain bushings 4' in abutting relationship, annular rings 8' may be loosely positioned upon the restricted portions of bushings 4'. Rings 8' may be provided with a plurality of apertures 9' through which bolts 10' may be positioned, the heads 11' of bolts 10' bearing upon the outer surface of one of the rings and the rings being drawn together by means of nuts 12' threadedly positioned upon the opposite ends of bolts 10', said nuts bearing upon the opposite ring 8'.

This form of my invention possesses all of the desirable attributes of the form shown in Fig. 1, the difference being merely in the means for retaining the bushings 4' in abutting relationship and thereby confining gasket 7'.

I claim as my invention:

1. A coupling for joining adjacent ends of pipes or fittings lined with a corrosive or abrasive resistant lining, comprising in combination, bushings mounted upon the end of each pipe, said bushings each having an internal flange adapted to abut against the outer circumferential portion of the end of its respective pipe, said bushings having cooperating abutments adapted when engaged to form an annular recess therebetween and for maintaining the ends of the pipes in predetermined spaced apart relation, an abrasive or corrosive resistant annular gasket confined in said recess and engaging the inner circumferential portions of the corresponding ends of said pipes, and means for maintaining said bushings in abutting relation.

2. A coupling for joining adjacent ends of pipes or fittings lined with a corrosive or abrasive resistant lining, comprising in combination, bushings mounted upon the end of each pipe, said bushings each having an internal flange adapted to abut against the outer circumferential portion of the end of its respective pipe, said bushings having cooperating abutments adapted when engaged to form an annular recess therebetween and for maintaining the ends of the pipes in predetermined spaced apart relation, an abrasive or corrosive resistant annular gasket confined in said recess and engaging the inner circumferential portions of the corresponding ends of said pipes and the adjacent ends of the lining of said pipes, and means for maintaining said bushings in abutting relation.

CHARLES PATRICK McHUGH.